United States Patent
Nishimura et al.

[15] 3,671,640
[45] June 20, 1972

[54] 2-METHOXY-4-METHYLPHENYL-N-METHYLCARBAMATE AND INSECTICIDAL COMPOSITIONS CONTAINING THE SAME

[72] Inventors: Tatsumi Nishimura, Shimizu; Tadahiko Inoue, Ogasa-gun; Takeo Tsuboi, Ikeda; Masaru Kado, Yokohama, all of Japan

[73] Assignee: Kumiai Chemical Industry Co., Ltd., Tokyo, Japan

[22] Filed: July 2, 1969

[21] Appl. No.: 838,700

[52] U.S. Cl. .................................424/300, 260/479 C
[51] Int. Cl. ...................................C07c 125/06, A01n 9/24
[58] Field of Search .................260/479 C; 424/300

[56] References Cited

OTHER PUBLICATIONS

Metcalf et al., Agricultural and Food Chem., (May/June, 1965), pages 224 and 226.

*Primary Examiner*—James A. Patten
*Attorney*—Stevens, Davis, Miller & Mosher

[57] ABSTRACT

Novel 2-methoxy-4-methylphenyl-N-methyl-carbamate and insecticidal compositions comprising the same as an active ingredient.

2 Claims, No Drawings

2-METHOXY-4-METHYLPHENYL-N-METHYLCARBAMATE AND INSECTICIDAL COMPOSITIONS CONTAINING THE SAME

The present invention relates to a novel N-methylcarbamate and an insecticidal composition containing the N-methylcarbamate as an active ingredient, and more particularly to 2-methoxy-4-methylphenyl-N-methylcarbamate.

An object of the present invention is to provide 2-methoxy-4-methylphenyl-N-methylcarbamate having an excellent insecticidal activity and an insecticidal composition containing the same as an active ingredient.

Another object of the invention is to provide an insecticidal composition, which can develop an excellent insecticidal activity when spread on a rice field and is low in toxicity against warm blooded animals.

Recently it has been considerably interested to prevent paddy field rice plants from damage of green rice leafhopper and other leafhoppers. Namely, these harmful insects give damage directly to the rice plant and furthermore act as an insect vector of virus.

Many carbamate compounds, which are now practically used, show an excellent insecticidal activity against green rice leafhopper, but do not show a satisfactory activity against smaller brown plant hopper.

However, in control of green rice leafhopper, it is considerably desirable to control of small brown plant hopper simultaneously, in order to prevent rice stripe virus which is transmitted by smaller brown plant hopper and is now widely increased so becomes an important problem in rice production.

Since many conventional carbamate series insecticides have not been freely satisfactory, it has been usual that PHC (2-isopropoxyphenyl-N-methyl-carbamate), which has an activity against the smaller brown plant hopper but has a short residual effectiveness, is used together with some organic phosphate series insecticide or BHC which are effective to the smaller brown plant hopper.

The inventors have found from the result of various investigations that the compound used as an active ingredient according to the invention, shows an excellent insecticidal activity against both the green rice leafhopper and the smaller brown plant hopper.

Furthermore, the compound according to the invention has a higher durability, so-called residual activity as compared with conventional many carbamate series compounds. Moreover, conventional carbamate series insecticides are apt to exhibit high toxicity against warm blooded animals, while 2-methoxy-4-methyl-phenyl-N-methylcarbamate of the active ingredient according to the present invention has a low toxicity against warm blooded animals. Namely, an oral acute toxicity for mouse (LD–50) is more than 300 mg/kg, and the compound of the present invention is extremely low in toxicity.

2-methoxy-4-methylphenyl-N-methylcarbamate of the active ingredient according to the present invention is synthesized by the following method.

Twenty-five g (0.18 mole) of 2-methoxy-4-methylphenol is dissolved in 100 cc of acetone and thereto is added 10.3 g (0.18 mole) of methyl isocyanate and further 0.5 of triethylamine is added as a catalyst. The reaction vessel is capped and left to stand on an ice-water bath for 1 hour. When the evolution of heat stops, the reaction mixture turns room temperature and is left to stand over a night to age the reaction.

When the reaction vessel is opened after the night, an irritative oder of methyl isocyanate is lost no longer and the reaction is completed.

After the completion of the reaction, the solvent of acetone is distilled off under a reduced pressure, and to the residue is added ligroin to precipitate crystals, which are filtered off and recrystallized by adding ligroin to obtain 34 g of pure and white prism crystal having a melting point of 100° to 101° C (Yield 97 percent).

Elemental analysis as $C_{10}H_{13}NO_3$

|  | C% | H% | N% |
|---|---|---|---|
| Calculated value | 61.52 | 6.712 | 7.175 |
| Found value | 61.35 | 6.85 | 7.20 |

IR spectrum (KBr method): 3,330 cm$^{-1}$, 2,960 cm$^{-1}$, 1,718 cm$^{-1}$, 1,610 cm$^{-1}$, 1,510 cm$^{-1}$, 1,288 cm$^{-1}$, 1,264 cm$^{-1}$, 1,210 cm$^{-1}$, 1,154 cm$^{-1}$, 1,130 cm$^{-1}$, 1,040 cm$^{-1}$, 950 cm$^{-1}$, 860 cm$^{-1}$, 830 cm$^{-1}$, 770 cm$^{-1}$, 720 cm$^{-1}$, This substance is identified with the object compound from the above analytical data.

The compound according to the present invention is a white prism crystal and is easily soluble in an organic solvent but poorly water-soluble.

In an application for agricultural and horticultural insecticide, the compound of the invention is mixed with a carrier (diluent) and, if necessary, a surfactant to formulate dust, wettable powder, emulsifiable concentrate or granule, which is directly spread or used after diluted to a suitable concentration.

The invention will be explained with respect to some preparation examples, but the additives and the mixture ratio can be varied in a wide range. The percent means by weight.

EXAMPLE 1 DUST

Two percent of the compound according to the invention, 5 percent of diatomaceous earth, 50 percent of kaolin and 43 percent of talc were mixed and pulverized, and the resulting powder is dusted.

EXAMPLE 2 WETTABLE POWDER

Twenty percent of the compound of the invention, 20 percent of diatomaceous earth, 55 percent of kaolin and 5 percent of a mixture of polyoxyethylene alkylaryl ether, and organic sulfonate, which is a spreading agent, were mixed and pulverized to form a wettable powder, which is used as a suspension in water.

EXAMPLE 3 EMULSIFIABLE CONCENTRATE

Twenty percent of the compound of the invention, 60 percent of xylene and 20 percent of a mixture of polyoxyethylene alkylaryl ether and organic sulfonate, which is an emulsifier, were mixed and dissolved to form an emulsifiable concentrate, which is used after diluted with water.

EXAMPLE 4 GRANULE

In a rotary-drum mixer was charged 92 percent of lime stone powder of 10 to 20 meshes and thereon was sprayed a solution dissolving 4 percent of polyoxyethylene alkylaryl ether of 4 percent of methanol. The mixer was rotated until the surface of the powder was uniformly coated with the solution. Then 4 percent of the compound of the invention pulverized less than 300 meshes was added into the mixer and the mixer was rotated until the compound adhered on the surface of the coated powder uniformly and then the coated powder was passed through a screen under an air flow and dried to form granules.

As described above, the compound according to the present invention is used in the form of dust, wettable powder, emulsifiable concentrate and granule. As the solid carrier used for dust, wettable powder and granule, mention may be made of clay, feldspar, mica, mutshell, cellulose powder, residue of plant extract, active carbon and the like in addition to the above described diatomaceous earth, kaolin and lime stone. As the liquid carrier used for emulsifiable concentrate, use may be made of water and organic solvents such as alcohol, benzene, xylene, toluene, dimethyl-sulfoxide and mineral oil fraction. As the surfactant, mention may be made of polyoxyethylene alkylaryl ether, organic sulfonate, fatty acid, a condensate of fatty alcohol or fatty-substituted phenol and ethylene oxide, fatty esters or ethers of polyhydric alcohol and a block copolymer of ethylene oxide and propylene oxide. Further, other anionic or non-ionic surfactants can also be used.

Then experimental examples for preventing harmful insects by means of the active compound according to the present invention will be explained.

EXPERIMENTAL EXAMPLE 1

Test for controlling the housefly

The houseflies (Takatsuki strain) were bred on a culture of beam-curds lees and 3 days after fledged female adults were anesthetized with carbon dioxide gas. On the back of the breast of the adult was applied dropwise 1 μl of the sample, which had been diluted with acetone to a predetermined concentration, by means of a microsyringe and 24 hours after treated, number of dead insects was recorded.

The breeding and experiment were carried out under the environmental condition of 25° C and 75 percent humidity respectively. When the mortality was more than 90 percent, the experiment was effected with the sample having a lower concentration of the active ingredient and $LD_{50}$ per one adult was measured. The experimental results are shown in the following Table 1.

TABLE 1

| Active ingredient | $LD_{50}$ for the housefly (γ/♀) | $LD_{50}$ administered orally to mouse (mg./kg.) |
|---|---|---|
| 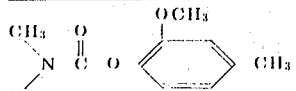 (the present compound) | 0.35 | >300 |
| 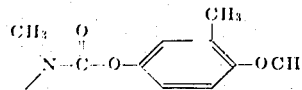 (comparative compound) | 0.79 | <30 |
| 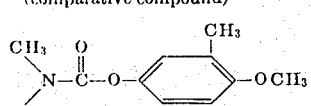 (comparative compound) | 2.31 | <30 |
| 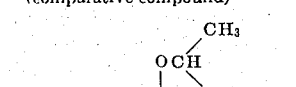 (PHC,* comparative compound) | 0.56 | 44 |
| 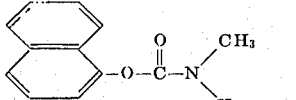 (Sevin,** comparative compound) | 5.0 | 347 |

*2-isopropoxyphenyl-N-methylcarbamate.
**1-naphthyl-N-methylcarbamate.

EXPERIMENTAL EXAMPLE 2

Test for preventing the smaller brown plant hopper

1. Contact test

Emulsifiable concentrate of sample formulated as described in Example 3 was diluted with water at a concentration of 2, 10, 50, or 100 ppm. Diluted solution was sprayed on potted rice plants by means of a spray nozzle at a rate of 100 l/10 ares. After drying in air, the rice plants were cut at the root side, and then the cut rice plants were put into a glass bottle containing water and covered with a cage. Twenty female adults of the smaller brown plant hopper were freed in the cage and after 24 hours, the median lethal concentration ($LC_{50}$) was measured.

2. Systemic activity test

The diluted solution used in the above contact test was charged into a glass tubular bottle and the cut rice stem was put thereinto. The stem was coated with veseline at a distance of 1 cm above the liquid level so as to prevent the rising of the solution by capillary effect. Then the stem was fixed with a wire and covered with a cage, and thereafter the insects to be tested were freed therein. The median lethal concentration ($LC_{50}$) was determined from the mortality after 24 hours.

The results are shown in the following Table 2.

TABLE 2

| Active ingredient | Contact activity $LC_{50}$, p.p.m. | Systemic activity $LC_{50}$, p.p.m. |
|---|---|---|
| 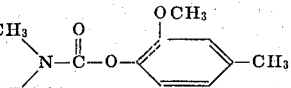 (the present compound) | 15 | 1~3 |
| 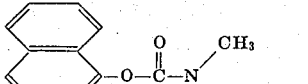 (Sevin, comparative compound) | 124.3 | 19.7 |

EXPERIMENTAL EXAMPLE 3

Test for preventing the green rice leafhopper

1. Contact test

Emulsifiable concentrate of sample formulated as described in Example 3 was diluted with water at a concentration of 2, 10, 50, or 100 ppm. Diluted solution was sprayed on potted rice plants by means of a spray nozzle at a rate of 100 l/10 ares. After drying in air, the rice plants were cut at the root side, and then the cut rice plants were put into a glass bottle containing water and covered with a cage. Twenty female adults of the green rice leafhopper were freed in the cage and after 24 hours, the median lethal concentration ($LC_{50}$) was measured.

2. Systemic activity test

The diluted solution used in the above contact test was charged in a glass tubular bottle and the cut rice stem was put thereinto. The stem was coated with vaseline at a distance of 1 cm above the liquid level so as to prevent the rising of the solution by capillary movement. Then the stem was fixed with a wire and covered with a cage, and thereafter the insects to be tested were freed therein. The median lethal concentration ($LC_{50}$) was determined from the mortality after 24 hours.

The result is shown in the following Table 3.

TABLE 3

| Active ingredient | Contact activity $LC_{50}$, p.p.m. | Systemic activity $LC_{50}$, p.p.m. |
|---|---|---|
| 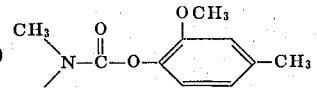 (the present compound) | 36 | 4.5 |
| 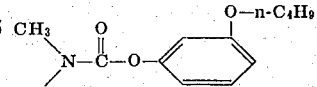 (comparative compound) | 50~250 | 250 |
| 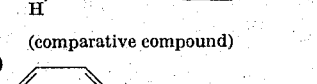 (Sevin, comparative compound) | 38 | 12.0 |

EXPERIMENTAL EXAMPLE 4

Residual effectiveness against the smaller brown plant hopper

Emulsifiable concentrate of the compound as shown in Example 3 was diluted with water to a concentration of 500 ppm. The diluted solution was sprayed on potted rice plants by means of a spray nozzle at a rate of 100 l/10 ares. Three, 5, 7, 10, 14, and 20 days after sprayed, the rice plants were cut at the root sides and the cut rice plants were put into a glass tubular bottle containing water, respectively. The rice plant was covered with a cage and twenty female adults of the smaller brown plant hopper were freed therein, whereby the mortality after 24 hours was measured. Each experiment was repeated three times.

The results are shown in the following Table 4.

TABLE 4

| Active ingredient | Mortality (percent) | | | | | |
|---|---|---|---|---|---|---|
| | 2 days | 5 days | 7 days | 10 days | 14 days | 20 days |
| (the present compound) $HC_3\text{-N(H)-C(=O)-O-}$ [phenyl with $OCH_3$, $CH_3$] | 100 | 100 | 100 | 100 | 98 | 93 |
| (PHC, comparative compound) $CH_3\text{-N(H)-C(=O)-O-}$ [phenyl with $OCH(CH_3)_2$] | 100 | 100 | 73 | 32 | 0 | 0 |
| (Sevin, comparative compound) naphthyl-$O-C(=O)-N(H)(CH_3)$ | 74 | 10 | 0 | | | |

EXPERIMENTAL EXAMPLE 5

Insecticidal activity against the first generation of rice stem borer

The rice plants were cultivated to a length of about 30 cm in a pot having a diameter of 15 cm and about 50 ova per pot of the rice stem borer just before hatching were inoculated on the stem of the rice plant. After 7 days, the solution to be tested having a predetermined concentration was sprayed on the rice stem in a rate of 100cc/3 pots by means of a spray gun.

Three days after sprayed, the rice stem was cut and opened and the number of died or living insects was calculated. The experiment (three pots) was repeated three times.

EXPERIMENTAL EXAMPLE 6

Effectiveness on the leafhoppers when various granules are sprayed on the water surface of paddy field.

Insects to be tested:

female adults of green rice leafhopper (Kikukawa Strain), female adults of smaller brown plant hopper (Kikukawa Strain)

Test method:

The paddy field rice plants were transplanted in a polybucket of 25×32×10cm and 10 days after transplanted, the polybucket was filled with water to a depth of 3 to 4 cm and a predetermined amount of each active ingredient as shown in the following Table 6 was spread by hand. The rice plant in the polybucket was covered with a cage and at 3 and 7

TABLE 6

| Active ingredient | Content of active ingredient percent | Green rice leafhopper | | | | Smaller brown plant hopper | | | |
|---|---|---|---|---|---|---|---|---|---|
| | | 3 days | | 7 days | | 3 days | | 7 days | |
| | | Number of insects | Mortality percent | Number of insects | Mortality percent | Number of insects | Mortality percent | Number of insects | Mortality percent |
| Present compound | 4 | 19 | 100 | 39 | 82.0 | 37 | 100 | 40 | 100 |
| Comparative compound: | | | | | | | | | |
| Bassa [1] | 4 | 16 | 94.0 | 24 | 70.8 | 56 | 37.6 | 36 | 50.0 |
| Tsumacide [2] | 4 | 20 | 100 | 31 | 35.5 | 33 | 45.5 | 41 | 34.2 |
| Mipcin [3] | 5 | 12 | 91.6 | 27 | 70.4 | 42 | 31.0 | 49 | 5982 |
| Sevin | 8 | 20 | 100 | 32 | 78.2 | 39 | 97.5 | 45 | 44.5 |

[1] 2-sec-butylphenyl-N-methylcarbamate; [2] 3-methylphenyl-N-methylcarbamate; [3] 2-isopropylphenyl-N-methylcarbamate.

TABLE 5

| Active ingredient | Mortality (percent) |
|---|---|
| Present compound | 87.5 |
| (comparative compound) $CH_3\text{-N(H)-C(=O)-O-}$ [phenyl with $O\text{-}n\text{-}C_4H_9$] | 8.5 | days after spread, insects to be tested were freed in the cage and the number of living or died insects after 24 was measured.

Amount of granule used: 8 kg/10 ares

What is claimed is:

1. 2-methoxy-4-methylphenyl-N-methylcarbamate.
2. An insecticidal composition comprising as an active ingredient an insecticidally effective amount of 2-methoxy-4-methylphenyl-N-methylcarbamate and an inert carrier.

* * * * *